United States Patent [19]

Chubb

[11] 4,244,350

[45] Jan. 13, 1981

[54] SOLAR ENERGY HEAT-STORAGE TANK

[75] Inventor: Talbot A. Chubb, Arlington, Va.

[73] Assignee: The United States of America as represented by the Secretary of the Navy, Washington, D.C.

[21] Appl. No.: 24,136

[22] Filed: Mar. 26, 1979

[51] Int. Cl.$^3$ .................. F24H 7/00; F28D 13/00
[52] U.S. Cl. .................. 126/400; 165/104 M; 165/104 S; 165/105
[58] Field of Search .............. 126/400, 430, 436, 437; 165/104 S, 104 M, 105, 18

[56] References Cited

U.S. PATENT DOCUMENTS

| | | | |
|---|---|---|---|
| 2,231,236 | 2/1941 | Wentworth | 126/400 |
| 2,677,664 | 5/1954 | Telkes | 126/436 |
| 3,492,461 | 1/1970 | Lawrence | 126/400 |
| 3,972,183 | 8/1976 | Chubb | 126/433 |
| 3,997,001 | 12/1976 | Chubb | 126/400 |
| 4,008,758 | 2/1977 | Chubb | 165/94 |
| 4,037,579 | 7/1977 | Chubb | 126/400 |
| 4,088,183 | 5/1978 | Anzai | 126/400 |
| 4,119,143 | 10/1978 | Robinson | 126/437 |
| 4,182,409 | 1/1980 | Robinson | 126/400 |
| 4,184,477 | 1/1980 | Yuan | 165/105 |

Primary Examiner—James C. Yeung
Assistant Examiner—Daniel O'Connor
Attorney, Agent, or Firm—Robert S. Sciascia; William T. Ellis; Philip Schneider

[57] ABSTRACT

An improved energy storage superheater assembly for storing heat energy resulting from solar or other types of energy. An enclosed housing includes a heat transfer means in the bottom or top which is heated by $SO_2 + O_2$ due to solar chemical reaction or any other suitable means. The heat transfer means heats wet steam in a superheater piping that passes through the heat transfer means to produce superheated steam. A plurality of vertical, potassium-containing steel wall heat pipes extends from the heat transfer means and distributes heat over the large area of the housing. Vertical containers which contain a salt are assembled among the vertical pipes and are heated by the heat radiated and convected from the vertical pipes in order to store heat in the salt-containers by "heat of fusion". During heat withdrawal, heat is radiated and convected from the salt-containers to the vertical steel pipes. Heat is carried to the heat transfer means by the steel pipes which in turn heats the superheater tubes.

31 Claims, 5 Drawing Figures

SOLAR ENERGY HEAT-STORAGE TANK

BACKGROUND OF THE INVENTION

This invention relates to a solar energy power generating system and more particularly to a solar energy heat storage assembly.

Natural resources such as fuel, oil, coal and wood are becoming depleted. Therefore persons are looking toward the use of solar energy for supplying the necessary heat to produce electrical energy by use of steam-operated electrical generating plants. In order to provide continuous operation during the absence of sunlight, energy storage facilities must be provided which will store energy during sunlight time and provide heat during non-sunlight time.

Heretofore heat storage systems have been set forth in U.S. Pat. Nos. 3,997,001, 4,008,758 and 4,037,579. These patents disclose systems by which heat from solar energy may be used and stored for use during non-sunlight times. These systems use salt as a storage medium. Salt has poor thermal conductivity; therefore, it is necessary that means be provided to compensate for the poor thermal conductivity of the salt. This invention is an improvement over the listed prior art patents and is most similar to U.S. Pat. No. 4,037,579.

SUMMARY OF THE DISCLOSURE

An energy storage assembly which functions to replace a steam generator of a conventional oil fired boiler or other type of steam generator in a conventional electrical power plant. The energy storage assembly is operated by solar energy or other suitable heat means which supplies heat sufficient for generating steam during sunlight hours as well as during non-sunlight hours. The energy storage assembly accomplishes this function by receiving energy from a solar energy collector system during the sunlight hours, by storing this energy as heat and heat of fusion in energy storage salts and by transporting heat to boiler tubes for converting externally supplied water or wet steam to high pressure dry steam within the heat storage assembly. The high pressure steam is fed to a steam electrical generator to generate electrical energy.

DETAILED DESCRIPTION

Figure 1:
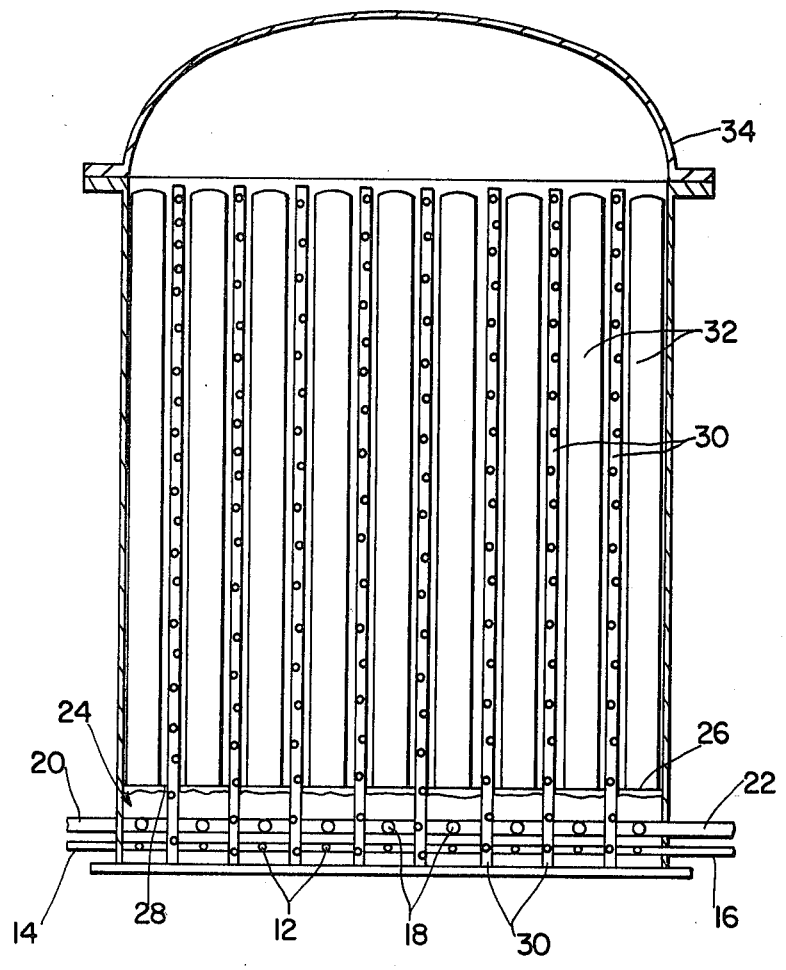
FIG. 1 illustrates a vertical-sectional view of an energy storage assembly.

Now referring to the drawing, there is shown a vertical cross-sectional view of a rectangular storage tank or housing 10 made of stainless steel or any other suitable material. (Said tank need not be a pressure-containing vessel.) The storage tank includes therein heat release pipes 12 which extend back-and-forth across the bottom of the tank and connect with an inlet heater pipe 14 and an outlet heater pipe 16. Just above the piping 12, a second piping network 18 is arranged to extend back-and-forth across the tank. The piping 18 connects with a wet-steam or water input heater 20 and to a superheated steam output header 22. The piping 12 and 18 are immersed with in a pool of liquid metal 24 formed of an alloy containing aluminum, magnesium or zinc, in the bottom of the tank. A shelf 26 is secured directly above the liquid metal. The shelf 26 is provided with a plurality of holes 28 therein. One end of a two inch diameter stainless steel evacuated, closed ended vertical heat transfer tube or heat pipe 30 having a length substantially the same as the height (about 10 ft) of the tank extends through the holes 28 in the shelf 26 such that one end of each heat pipe extends into the pool of liquid metal within the bottom of the tank. The tubes contain a small portion of heat conductive high vapor pressure material such as potassium. The interior of said pipes are coated with metal felt, or are otherwise treated, so as to promote wetting by potassium metal, thereby promoting wicking action, in accordance with procedures well known in the heat pipe art. The potassium aids in distributing heat over the large aggregate surface area of the pipes. The outside surface of each pipe 30 is oxidized or coated so that the pipe becomes a good infrared emitter.

Figure 2:
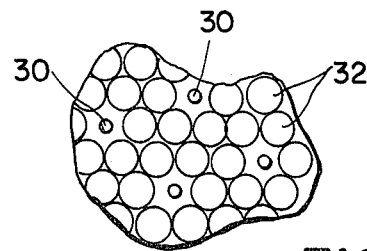
FIG. 2 is a partial view which illustrates the arrangement of the salt cans and heat pipes.

The shelf 26 supports a plurality of salt-containing cans 32 which may have the same length as the heat pipes 30. The salt-containing cans substantially fill the area between the upstanding tubes or pipes 30 and their length extends from the top of the shelf to the upper end of the tank. The salt in the cans is $NaCl-Na_2CO_3$ eutectic having a melting point of about 635° C. or $NaCl-CaCl_2$ having a melting point of about 500° C. The salt cans need not be air tight and can be made to breathe. The tank is closed by a top 34 and is filled with a nonoxidizing gas such as helium or hydrogen at atmospheric pressure which aids in convection of heat from and to the upstanding pipes and salt-containing cans. FIG. 2 illustrates the configuration of the salt cans and heat pipe.

The tank should be insulated against the escape of heat by use of sufficient insulation or it may be placed in the ground which acts as an insulator to prevent loss of heat.

In operation, a heat release fluid, solution or gas, such as heated $SO_2+O_2$ is admitted through header inlet 14 to flow through the network of piping 12 in the bottom of the tank. The heat release gas in the pipes gives off heat to the pool of liquid metal as the gas passes back-and-forth along the bottom of the tank in piping 12. The gas is chemically converted to $SO_3$ as it gives off its heat and passes out through the header outlet 16 to a solar heater system such as described in U.S. Pat. No. 3,972,183. The liquid metal heats the upstanding tubes and potassium therein which distributes the heat over the entire length of the tubes. The tubes give off heat to heat the salt in the containers by radiation plus convection. The salt stores the heat for future use by heat of fusion. The liquid metal being heated by the heat release fluid, heats the wet steam in piping network 18 to convert the wet steam to superheated steam as the wet steam passes through the piping 18 above the release piping.

During non-sunlight periods, the liquid metal will cool down due to the absence of any heat release gas passing through the network of pipes 12. As the liquid metal begins to cool to a temperature below that of the upstanding pipes 30, heat will transfer from the pipes 30 to the liquid metal. As the pipes 30 begin to cool due to heat loss over their surface area because of the transfer of heat to the pool of liquid metal, heat from the salt in the salt-containing cans will be radiated and convected to the upstanding pipes, which transfer heat to the pool of liquid metal. This transfer of heat continues until all the heat has been withdrawn from the salt. As the heat is withdrawn from the salt in the salt-containing cans, the liquid metal in the bottom of the tank is maintained at a temperature sufficiently high to convert the wet steam to superheated steam. It has been determined that salt-containing cans as set forth above can supply heat for about three days of non-sunshine periods.

Energy storage tanks such as described above can be designed to operate over a wide temperature range such as 200° C. to 1000° C. depending upon the materials used throughout the tank system.

As can be seen from the drawing, especially FIG. 2, there is a gap, or space, surrounding each of the vertical heat pipes 30 and the surrounding heat storage means, or salt cans, 32. The existence of the gap provides several advantages:

1. The heat pipes can be manufactured separately from the salt cans. Since a principle application of the invention will use alkali metal heat pipes, the heat pipes need to be produced to high-vacuum standards. Mass production of simple units is important in meeting cost goals.

2. The total area of heat pipe wall can be much less than the area of the salt can walls. FIGS. 1 and 2 show a vertical heat pipe wall area which is about 18 times less than the vertical area of the salt containers. Large salt can area is required to compensate for the poor thermal conductivity of the salts if excessive temperature drops during energy input and output are to be avoided. In contrast, the heat pipe cost is the major cost in the storage system, hence keeping the heat pipe wall area to a minimum is important. If the heat pipe walls and the salt container walls were the same as in U.S. Pat. No. 4,037,579, entitled "ENERGY STORAGE-BOILER TANK USING SALT FUSION AND HEAT PIPING", then the vertical area of heat pipe wall and salt container wall would be the same.

3. Having a gap between heat pipe and salt containers permits energy to be liberated at one height on a heat pipe and received at a different height on the salt containers, thereby permitting energy to be distributed vertically, helping to eliminate hot and cold spots in the storage tank.

4. Having a gap between heat pipe and salt containers means that excessive reflectivity of salt can walls becomes a reduced problem. Looking at FIG. 2, one observes that most heat rays radiated from heat pipes 30 and reflected from salt containers 32 will not return directly to heat pipes 30, but instead will strike other salt containers in multiple bounces. Heat radiation is absorbed at each bounce. As a result of the multiple reflections that result from the high ratio of can area to heat pipe area, a reflectivity of a salt-can surface of 50% acts like a reflectivity of less than 10%. This reduction in effective reflectivity disappears if the gap is made very small, i.e., as the can surfaces approach the heat pipe surface. Thus, the transfer of heat between the heat pipes and the salt cans is made considerably more efficient.

It has been found that a fairly close arrangement of salt cans and heat pipes with a gap of approximately two inches is preferred. The gap should probably be no less than one inch if a serious drop in heating efficiency is to be avoided.

Figure 3:
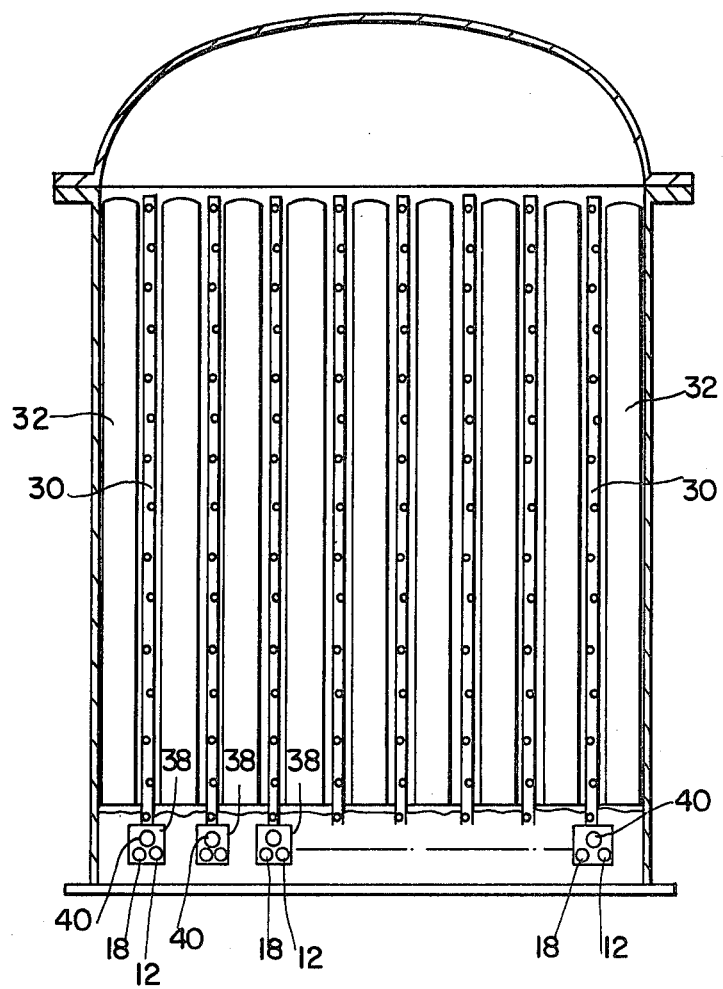
FIGS. 3-5 are modifications of the storage facility of FIG. 1.

As shown in FIG. 3, instead of or in addition to employing a pool of liquid metal as the heat transfer medium, primary horizontal pipes 40 in physical contact with the heat release pipes 12 and steam pipes 18 may be used to operate as heat pipes. The horizontal pipes contain a heat transfer medium such as potassium, such as used in the vertically extending pipes 30. Heat will be transferred from the heat release pipes 12 to horizontal heat pipes 40 and along the horizontal heat transfer pipes 40 to vertical heat transfer pipes 30 by the use of a block of metal 38 such as aluminum which rests upon the horizontal pipes and upon which the lower end of the vertically extending pipes 30 rest. The block of metal can be contoured to the horizontal pipes for better heat transfer. Heat will be transferred from the vertical pipes 30 to the steam pipes 17 by passing through the metal blocks 38 and along the heat pipes 40, which are in thermal contact with steam pipes 18.

The operation of this modification is substantially the same as for the tank assembly that includes only the pool of liquid metal. Fluid heated by the solar system heats the metal blocks and horizontal heat transfer pipes which heat the metal blocks which then heats the vertical pipes which in turn heats the salt. The solar heated fluid, metal blocks, and horizontal pipes heat the steam to superheated steam. During non-sunlight times, the heated salt transmits heat to the vertical pipes 30 which transmits the heat to the blocks of metal and horizontal heat transfer pipes 40 and in turn to the steam pipes 18.

Figure 4:
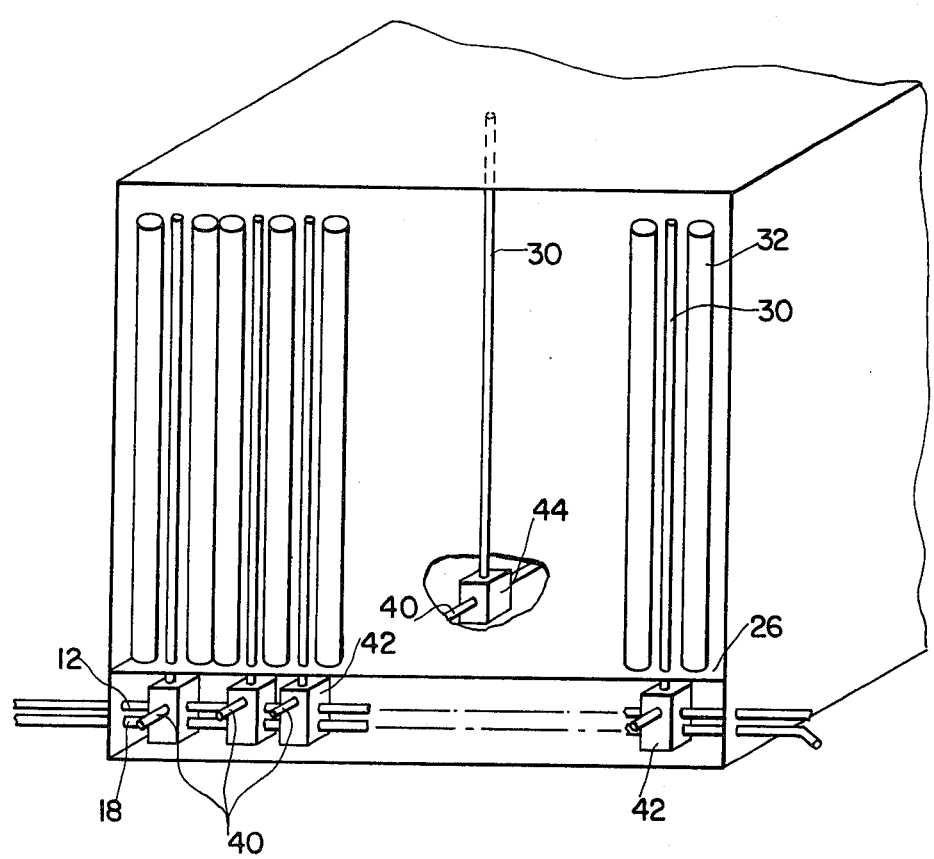

FIG. 4 illustrates another modification of the heat transfer assembly wherein a single heat release pipe 12 and a single steam pipe 18 are used. These pass through a plurality of aligned primary metal blocks 42 and are oriented perpendicular to horizontal heat pipes 40 which also pass through the primary metal blocks 42. The horizontal heat pipes 40 extend across the width of the housing and pass through secondary metal blocks 44 which are supported by the bottom of the housing below shelf 26. The vertical heat pipes 30 rest on each of the metal blocks 42 and 44 therefore there are as many metal blocks as there are vertical pipes 30. The salt cans rest on a platform or shelf 26 the same as in the previous modifications.

In operation of this modification, heat supplied by heat release pipes 12 heats the primary metal blocks 42 which in turn heat the steam pipes 18 and the horizontal heat pipes 40, in turn heat the secondary metal blocks 44, which heat vertical pipes 30. The vertical pipes through heat radiation and convection the salt containers. During non-solar heat periods (if solar heat is used) the salt cans release heat to heat the vertical pipes which heat the secondary metal blocks 44. The metal blocks 44 heat the horizontal heat pipes 40 which heat primary metal blocks 42. Metal blocks 42 heat the steam pipe as they normally do. Thus, the metal blocks 42 are heated by the heat release piping 12 or by the horizontal heat pipes 40. In this manner, the steam piping is heated at all times.

Figure 5:
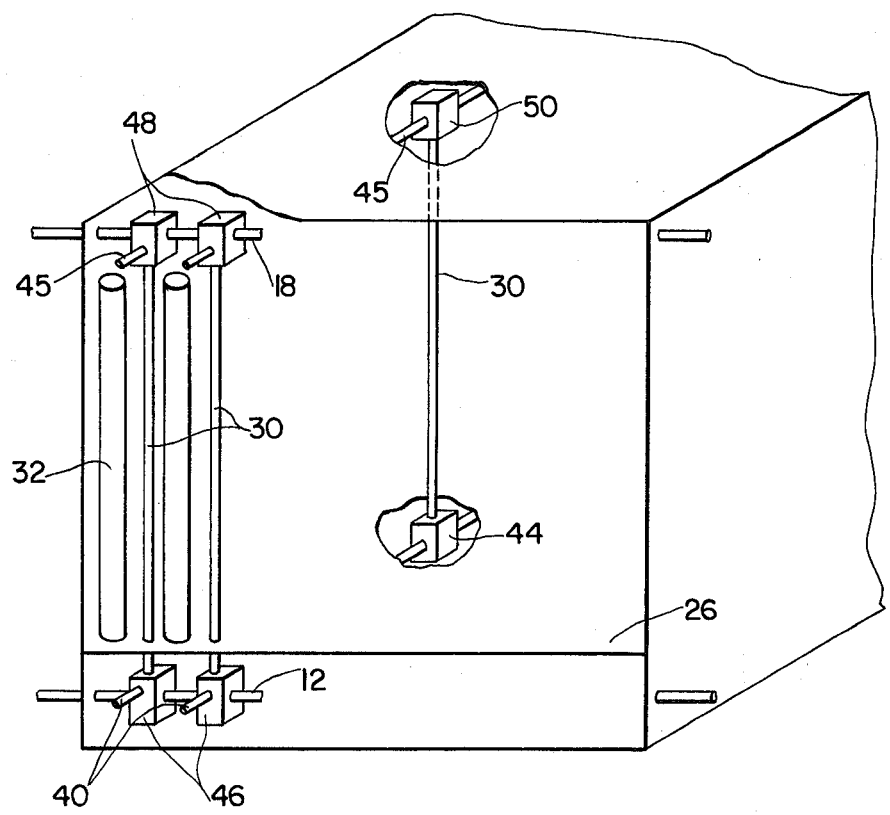

FIG. 5 is a modification of the system shown in FIG. 4. In the system of FIG. 5, the heat release piping 12 passes through aligned main heat distribution metal blocks 46 in the bottom of the housing and the steam pipes 18 pass through heat distribution metal blocks 48 in the upper area of the housing. Lower horizontal heat pipes 40 pass through the main heat distribution blocks 46 and through the secondary metal blocks 44 in the bottom of the housing. Upper horizontal heat pipes 45 pass through main heat distribution blocks 48 and through the secondary metal blocks 50. Vertical heat pipes rest upon the metal blocks 44 and 46 in the bottom of the housing, and the metal blocks 48 and 50 in the upper section of the housing rest upon the upper ends of vertical heat pipes 30. In this arrangement heat release piping 12 heat the main heat distribution metal blocks 46 which heat the lower horizontal pipes 40 in the bottom of the housing. The horizontal pipes 40 in the bottom of the housing heat the secondary metal blocks 44, which heat the vertical pipes 30. The vertical pipes 30 heat the metal blocks 48 and 50 in the upper end of the housing. Blocks 48 and 50 heat the upper horizontal pipes 45. The upper horizontal pipes 45 heat the metal blocks 48 in the upper section of the housing and the metal blocks 48 heat the steam pipe 18. The vertical pipes 30 also heat the salt cans when the heat transfer piping 12 is hot. If heat transfer piping 12 is not transferring heat, then the salt cans heat the vertical pipes 30 which heat the metal blocks 48 and 50 and upper horizontal heat pipe 45 to heat the steam pipes 18 passing through metal blocks 48. Thus it is seen that the steam piping is heated at all times, either by the heat from heat transfer piping 12 or by the heat from the salt cans.

In each of the modifications, the heat transmitting pipes 30 may be segmental, that is, made of shorter pipes thermally connected together. It is important that good heat thermal contact is made between the segments. Further the salt cans may be one or more containers so long as they extend the height of the heat transfer pipes 30.

In assembling the salt cans and vertical heat transfer pipes, the salt cans may be physical contact with each other; however, there should be a spacing between the vertical heat transfer pipes and the salt cans. The spacing around the vertical heat pipes aids convection of heat and helps to more evenly distribute the heat by radiation. A salt can vertical heat pipe configuration is shown in FIG. 2.

The modifications shown in FIGS. 4 and 5 illustrate a single heat transfer piping 12 and steam pipe 18. It will be obvious to one skilled in the art that the input end for each of the above could be connected to a manifold for distribution into a piping that passes through each of the metal blocks with their output ends connected to a manifold on the output side. In this construction more heat could be added to the structure and therefore more heat could be added to the steam pipe.

The heat transfer pipes 12 in the bottom of the tank may be replaced by electrical heating means, nuclear heating means or any other heat means that can be used to transfer heat to the salt cans.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An energy storage assembly which comprises:
an enclosed housing means;
heat transfer means in the bottom of said housing means;
heat release means for heating said heat transfer means;
a plurality of vertically extending heat conductive means within said housing means with one end of said heat conductive means in heat transfer relationship with the heat transfer means, said heat conductive means exending along the height of said housing means;
heat storage means, positioned in spaced relation with said heat conductive means for radiative and convective heating by said heat conductive means, each said heat conductive means being surrounded by a plurality of heat storage means and even the closest of the latter being fairly closely spaced from their associated heat conductive means so that the radiative heating from the heat transfer means is made more effective; and
steam pipe means in heat transfer relationship with said heat transfer means whereby heat from said heat transfer means is transferred to said steam pipe means.

2. An energy storage assembly as claimed in claim 1 wherein:
said heat transfer means in the bottom of said tank is a pool of liquid-metal.

3. An assembly as claimed in claim 1 wherein:
said heat conductive means is a heat pipe.

4. An energy storage assembly as claimed in claim 3 in which:
said heat pipe is tubular and contains a heat conductive material therein.

5. An assembly as claimed in claim 3 wherein:
said heat pipe is an evacuated tube containing a small amount of alkali metal.

6. An assembly as claimed in claim 5 wherein:
said alkali metal is potassium.

7. An assembly as claimed in claim 3 wherein:
said heat transfer means in the bottom of said housing is a pool of liquid-metal.

8. An assembly as claimed in claim 4 wherein:
said heat transfer means in the bottom of said housing is a pool of liquid-metal.

9. An assembly as claimed in claim 1 wherein:
said heat storage means is a plurality of stacked cans containing a salt.

10. An assembly as claimed in claim 9 wherein:
the salt in said cans in $NaCl-Na_2CO_3$ having a melting point of about 635° C.

11. An assembly as claimed in claim 8 wherein:
said heat storage means is a plurality of stacked salt containing cans.

12. An assembly as claimed in claim 9 wherein:
the salt in said cans is $NaCL-Na_2CO_3$ having a melting point of about 635° C.

13. An assembly as claimed in claim 2 wherein:
said liquid-metal is an alloy with major constituents selected from aluminum, magnesium or zinc.

14. An assembly as claimed in claim 1 which includes:
heat release pipe means within said heat transfer means for heating said heat transfer means.

15. An assembly as claimed in claim 14 wherein:
said heat release pipe means includes a network of pipes assembled back-and-forth across the bottom of said housing means through which a fluid flows.

16. An assembly as claimed in claim 15 wherein:
said heat transfer means is a liquid metal.

17. An assembly as claimed in claim 16 wherein:
said heat storage means is a plurality of stacked cans containing a salt.

18. An assembly as claimed in claim 17 wherein:
said plurality of cans include a salt of $NaCl-Na_2CO_3$ having a melting point of about 635° C.

19. An assembly as claimed in claim 14 wherein:
said heat transfer means in the bottom of said tank includes a plurality of spaced parallel horizontal pipes, said parallel horizontal pipes include therein a heat conductive material for transmitting heat to said vertically extending conductive tubular means.

20. An assembly as claimed in claim 19 wherein:
said heat parallel horizontal pipes are evacuated tubes containing a small amount of alkali metal.

21. An assembly as claimed in claim 19 which includes:
blocks of metal in heat transfer relationship with said heat transfer means and spaced, parallel horizontal pipes.

22. An assembly as claimed in claim 21 in which:
said metal blocks are assembled in the bottom area of said housing.

23. An assembly as claimed in claim 22 in which:
heat release pipe means pass through at least some of said metal blocks.

24. An assembly as claimed in claim 23 in which:
a steam pipe passes through the same metal blocks that said heat release pipe means passes through.

25. An assembly as claimed in claim 21 in which:
said metal blocks are assembled in the lower section of said housing and in the upper section of said housing.

26. An assembly as claimed in claim 24 in which:
said heat release pipe means passes through at least some of said metal blocks in the bottom of said housing, and
steam pipe means passes through at least some of said metal blocks located in the upper section of said housing.

27. An assembly as claimed in claim 26 in which:
said vertically extending heat conductive means are assembled in heat transfer relationships with said metal blocks in said upper and lower sections of said housing.

28. An assembly as claimed in claim 9 wherein:
the salt contained in said salt containing cans is $NaCl\text{-}NaCl_2$ having a melting point of about 500° C.

29. An assembly as claimed in claim 11 wherein:
the salt contained in said salt containing cans is $NaCl\text{-}NaCl_2$ having a melting point of about 500° C.

30. An assembly as claimed in claim 1 which:
said housing includes a non-oxidizing gas therein at normal pressure.

31. An assembly as claimed in claim 30 in which:
said non-oxidizing gas is hydrogen or helium.

* * * * *